March 13, 1951 W. J. DALY 2,544,779
DIAGNOSTISCOPE
Filed Dec. 28, 1948 2 Sheets-Sheet 2
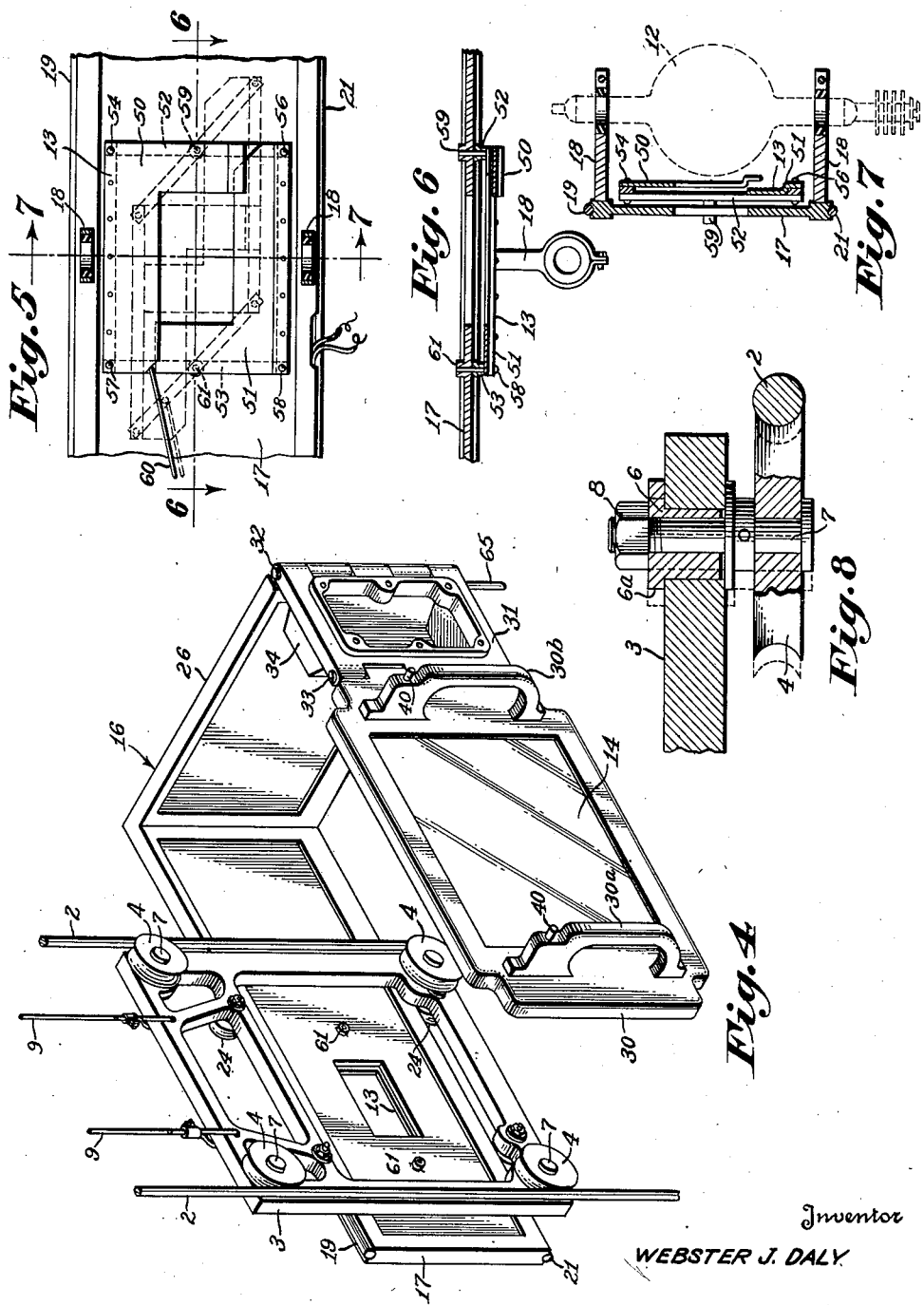
Inventor
WEBSTER J. DALY
By Mason, Fenwick & Lawrence
ATTORNEYS Patented Mar. 13, 1951

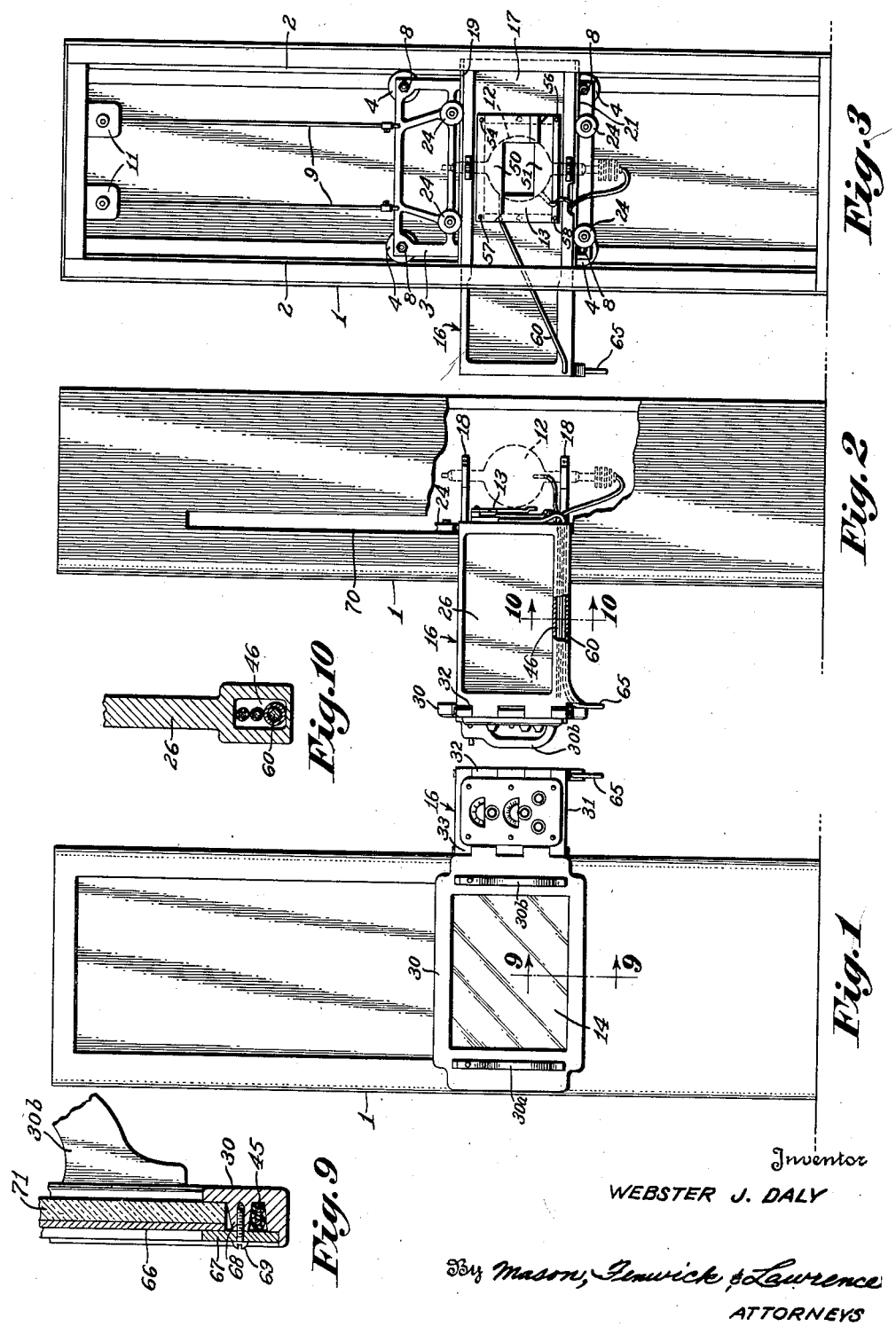

2,544,779

UNITED STATES PATENT OFFICE 2,544,779

DIAGNOSTISCOPE

Webster J. Daly, Los Angeles, Calif.

Application December 28, 1948, Serial No. 67,656

3 Claims. (Cl. 250—105)

This invention relates to X-ray apparatus and more particularly to mechanism for supporting the X-ray tube, shutter and the screen employed for diagnostic fluoroscope examinations. The invention relates directly to what is known in the art as vertical fluoroscopes.

The principal object of the invention is to provide novel improvements in the mechanism for supporting and controlling the parts of the apparatus in such a manner as to facilitate fluoroscopic examinations of the human anatomy.

Flouroscopic examinations of the human anatomy must necessarily be made in a darkened area and consequently great difficulties are usually encountered in manipulating the apparatus so that the parts of the human anatomy can be examined from the proper angle. It is necessary that the rays emanating from the X-ray tube be confined to a particular part of the patient's anatomy and to a particular desired position on the fluorescent screen. Heretofore it has been common to use a set of adjustable shutters for confining the X-ray emanations, one set of shutters being adjustable up and down, while another set is adjusted transversely of the first set. Also, heretofore it has been common practice to place the controls for operating these shutters at some distance from the position occupied by the operator. It will be readily apparent that in a fluoroscope the diagnostician must stand in front of the fluoroscopic screen on the side opposite the X-ray tube and therefore it is highly desirable that the shutter mechanism be very simple and be provided with means for varying the shutter opening with a minimum of effort. It is also highly desirable that the controls for the mechanism be so located with respect to the fluorescent screen that the operator can use simultaneously the same hand or hands for operating the controls that he uses for manipulating the fluorescent screen.

It is, therefore, an object of the invention to provide a novel and improved shutter mechanism that is operable from controls carried by the fluorescent screen.

Another object is to provide an improved shutter mechanism for fluoroscopic apparatus.

A still further object is to provide a novel supporting mechanism for simultaneously controlling the movement of the X-ray tube and the fluoroscopic screen.

Another specific object is to provide an improved shutter mechanism for use in connection with X-ray apparatus.

Other and further objects will become readily apparent from the following description when considered in connection with the accompanying drawings, illustrating an embodiment of the invention, and in which:

Figure 1 is a front elevation of fluoroscopic apparatus made in accordance with the present invention;

Figure 2 is an elevation of the right-hand side of Figure 1;

Figure 3 is a rear elevational view;

Figure 4 is a perspective view of the supporting mechanism for the X-ray tube and the fluoroscopic screen;

Figure 5 is a partial elevational view showing the shutter mechanism;

Figure 6 is a sectional view on line 6—6 of Figure 5;

Figure 7 is a sectional elevation on line 7—7 of Figure 5;

Figure 8 is a partial detail section through one corner of the carriage shown in Figure 4 showing the manner in which the rollers are adjustable with respect to the rods with which they are engaged;

Figure 9 is a partial sectional elevation on line 9—9 of Figure 1; and

Figure 10 is a partial sectional elevation on line 10—10 of Figure 2.

The accompanying drawings illustrate one embodiment of the invention in which 1 represents a vertically disposed cabinet which constitutes the support for a carriage on which, in turn is supported the X-ray tube, the shutter and a fluorescent screen. Although the invention is illustrated in connection with apparatus which is commonly known in the art as a vertical fluoroscope, it will be readily apparent that it is applicable to other types of apparatus.

The details of the construction of the cabinet are not shown because they form no part of the present invention. Suffice it to say that the cabinet is provided with suitable guide rails 2 which guide the carriage on which the X-ray apparatus is carried. It will be readily apparent from the first three figures of the drawings that the X-ray tube is supported on the carriage inside of the cabinet and that there is a projected arm which supports the fluorescent screen at some distance in front of the cabinet so that a person can stand against the cabinet between the X-ray tube and the screen during the fluoroscopic examination. In making the examination the operator can move the carriage up and down and with one of his hands with which he grasps the handles on the screen frame for adjusting the screen, can control the shutter opening, thereby adjusting the shape and size of the beam of X-rays being directed through the body of the patient on to the fluoroscopic screen. With the present invention the operator is enabled to make all of the necessary adjustments of the X-ray generator shutter and the fluoroscopic screen directly from his point of examination in front of the patient without having to remove both of his hands from the fluoroscopic screen.

To this end, a suitable carriage 3 is provided with rollers 4 having concave faces as shown in Figure 8, the rollers being mounted for rotation at the four corners of the carriage with their concave faces engaging the guides 2 which may be in the form of round rods. In order that the lateral movement of the carriage with respect to the guides may be limited, the rollers 4 on at least one side of the carriage, are provided with an eccentric bushing 6 through which their spindles 7 may be adjusted laterally. It will be readily apparent that the adjustment of the spindles 7 is made by loosening the nut 8 and adjusting the eccentric bushing 6 by turning the hexagonal head 6a. This adjusting mechanism is of conventional construction and it is believed that no further detailed description is necessary as it will be readily understood by a skilled mechanic. The weight of the carriage and the X-ray apparatus may be counter-balanced by suitable cables 9 which are adapted to wind around conventional spring biased drums or rollers and journalled in the depending supporters 11 at the top side of the cabinets. Of course, if desired, the cables 9 and the spring biased drums could be replaced by tension springs or, alternatively, the spring biased drums could be replaced by counter-balancing weights, all in a manner which is well known.

The X-ray apparatus which comprises the X-ray tube conventionally shown at 12, the shutter mechanism 13 and the fluorescent screen 14, are carried by a supporting frame 16 which in turn is adjustably supported by the carriage 3. A practical embodiment of this supporting frame comprises a magnesium casting 17 on which the X-ray tube 12 and the shutter mechanism 13 is carried directly. The X-ray tube 12 is carried by arms 18 which project from one side of the casting 17. This casting 17 is grooved on its upper and lower edges to receive steel bars 19 and 21 which serve as guide tracks to permit the lateral adjustment of the casting 17 with respect to the carriage 3. In this connection the carriage 3 is provided with suitable rollers 24, similar to the rollers 4 previously described, the rollers 24 being rotatively mounted on suitable spindles projecting laterally from the casing 3. The periphery of the rollers 24 is concave so that when they engage the rods 19 and 21 the casting 17 is guided in a fixed plane.

As will be more clearly shown in Figure 4, the casting 17 includes a transverse plate 26 which extends in a plane normal to the main body of the casting and is adapted to extend outwardly from the cabinet 1 when the components of the apparatus are in their assembled relation. In order that the fluorescent screen 14 shall be supported in definite relation to the X-ray tube 12, the screen is supported by a suitable frame 30 which is angularly and adjustably supported to the outer end of the plate 26 by means of an intermediate frame 31. The frame 31 is hinged to the plate 26 as at 32 and is also hingedly connected to the frame 30 as at 33. In a practical embodiment of the invention the frames 30 and 31 are made of a light-weight alloy casting similar to the alloy used in making the casting 17. Preferably the frame 31 is cast integrally with a box 34 which is adapted to house electrical controls and electrical measuring instruments. It will be readily apparent that in view of the two hinges, one at 32 and the other at 33, the fluorescent plate can be angularly adjusted about vertical axes and also the fluoroscopic screen can be moved a limited amount toward and away from the cabinet to facilitate the diagnostic examination of the patient. It will be understood that by folding the frame 31 outwardly about the hinge point 32 the distance of the screen 14 will be varied with respect to the X-ray tube 12. It will be noted that when it is necessary to swing the frame outwardly about the hinge point 32, certain lateral movement will be imparted to the carriage and X-ray tube and this can be compensated for by adjusting the frame laterally.

It will be noted that the screen frame 30 is provided with suitable handles 30a and 30b which will be grasped by the operator in positioning the screen 14 and in moving the complete X-ray apparatus up and down with respect to the patient during the examination. Each of the handles 30a and 30b are provided with electrical switches 40 which may be appropriately connected to control the energization of the X-ray tube 12. Preferably these switches are of the two-way type so that either one can be used to control the apparatus. The details of this are not shown in that the details thereof constitute no part of the invention, the relative positioning of the controls being the important feature as far as this invention is concerned. The electrical conductors leading to the switches are supported in a recess in the lower part of the frame 30 in the manner indicated at 45 in Figure 9. The conductors leading to the switches and to the electrical control box are supported in a channel of the side plate 26 in a manner indicated at 46 in Figures 2 and 10.

An important feature of the invention is the novel and simple shutter mechanism 13. This shutter comprises two L-shaped plates 50 and 51. These plates are made of lead or any other suitable material which is opaque to X-rays. The two plates are pivotally supported at their opposite ends on links 52 and 53, the link 52 being pivoted to the plate 50 at 54 and pivoted to the plate 51 at 56 and the link 53 being pivoted to the plate 50 at 57 and being pivoted to plate 51 at 58. The link 52 is centrally pivoted to the casting 17 at 59. Likewise the link 53 is centrally pivoted to the casting 17 at 61. From the above it will be seen that the plates 50, 51 and the links 52, 53 constitute a parallelogram mechanism, the plates 50, 51 forming one pair of the opposing elements of the parallelogram and the links 52, 53 forming the other pair of opposing elements, so that when the links are pivoted about their central points the plates 50 and 51 will approach each other in two directions simultaneously so that the shutter opening changes simultaneously in the two dimensions. In Figure 5 the position of maximum opening of the shutter is shown in full lines and the position of the plates when the opening is greatly reduced is shown in the dotted line position. It will be readily apparent that this construction provides a very simple mechanism which can be operated effectively by a simple control mechanism having a knob or lever which can be located on the screen frame 30, or at least, adjacent the handles 30a and 30b so that it can be continuously operated by the diagnostician making the examination. In the embodiment of the invention shown, a control lever 65 is mounted adjacent the lower front edge of the transverse plate 26 so that it is positioned adjacent the fluoroscopic screen. With this arrangement it will be necessary for the operator to remove only one of his hands temporarily from one of the handles in the event he wishes to change the shutter opening but this would not be inconvenient in view of the fact that he can readily reach the control at the position from which he makes the examination. The shutter plates 50, 51 may be regulated by the lever 65 through means of a Bowden wire control 60 of conventional construction, or any similar device such as a rod. If a Bowden wire control were used it could be arranged in the lower hollow channel of the transverse plate 26. If desired, the Bowden wire control could be extended to a point immediately adjacent one of the handles 30a or 30b so that it would be closer to the handles of the fluoroscopic screen frame. The flexibility of the Bowden wire would lend itself to the pivotal mounting of the fluoroscopic screen frame.

The fluoroscope screen 14 is of more or less conventional construction and comprises a lead glass panel 71 and conventional fluorescent screen panel 66. As shown in Figure 9, the screen frame 30 is provided with recesses on its back side, one of which is adapted to accommodate the lead glass and fluorescent screen panels and another of which accommodates the conductors shown at 45 and the third of which accommodates a fiber backing strip 67. A continuous boss 68 on the back side of the frame 30 is provided with holes which receive screws 69 which hold the backing strip 67, the lead glass panel 71 and the fluorescent screen panel 66 in assembled relation.

As mentioned previously, the details of the cabinet construction are not pertinent to the present invention except that it is necessary that the front of the cabinet between the X-ray tube and the fluorescent screen 14 be of such material that it is transparent to X-rays. In a practical embodiment of the present invention a pressed wood fiber composition panel has been used. It will, of course, be understood that the side panel of the cabinet must be provided with a suitable slot such as that shown at 70 to accommodate the casting 17.

From the foregoing description it will be readily apparent that a novel fluoroscope apparatus is provided which is of very simple construction while at the same time is very efficient in operation. It will also be noted that a mechanism is provided in which all of the components of the X-ray mechanism can be readily raised and lowered by the operator for the purpose of quickly bringing any part of the anatomy of the patient under observation. It will be also seen that the screen can be readily moved toward and away from the cabinet to accommodate different sized persons and that by reason of the fact that the apparatus can be moved vertically and the screen frame can be readily pivoted in the vertical plane, and that by having the patient turn at different angles with respect to the cabinet while standing in front thereof, the diagnostician can bring the fluoroscope apparatus to bear on the body of the patient from substantially any practical angle from which it may be desired to make an examination.

Although the invention has been described in considerable detail, it will be apparent to those skilled in the art that many variations are possible without departing from the inventive concept. It is therefore desired that the invention not be limited except insofar as is made necessary by the prior art and by the appended claims.

I claim:

1. Fluoroscopic apparatus comprising a support, an X-ray tube, a fluoroscopic screen spaced from said X-ray tube and a fluoroscopic shutter between said X-ray tube and said fluoroscopic screen, said fluoroscopic shutter comprising a plurality of links centrally pivoted to said support, a plurality of substantially L-shaped shutter plates, one of said shutter plates being pivotally connected to each of said links at points spaced by the same amount as the distance between the pivotal connection of said links to said support, and the other of said shutter plates being likewise pivoted to said respective links on the opposite side of the pivotal connection of said links with said support at points spaced a distance equal to the spacing between the pivotal connections of said links to said support, whereby said links and said shutter plates constitute a parallelogram linkage for supporting and guiding said plates with said plates forming one pair of opposing elements of the parallelogram and in which said shutter plates will simultaneously approach each other in directions parallel to the legs of said L-shaped plates thereby reducing the intervening opening simultaneously in both dimensions.

2. Fluoroscopic apparatus comprising a supporting frame, an X-ray tube, a fluoroscopic screen spaced from said X-ray tube and a fluoroscopic shutter carried by said frame and disposed between said X-ray tube and said fluoroscopic screen, said fluoroscopic shutter comprising a pair of levers centrally pivoted to said supporting frame, a pair of L-shaped X-ray opaque shutter plates each having a vertical and horizontal aperture-defining arm, each of said shutter plates being pivotally intercoupled with a corresponding end of each of said levers to form a parallelogram linkage with said levers and defining a rectangular aperture between said plates, and means intercoupled with one of said levers for rotating said lever, said plates being entirely supported and guided by said levers with the horizontal arms of the plates forming the horizontal elements of the parallelogram linkage and the levers forming the generally vertically arranged elements thereof, whereby rotation of one of said levers causes said plates to simultaneously approach or recede from each other to vary the intervening aperture therebetween simultaneously in both horizontal and vertical directions while the opposing aperture forming arms are maintained in relative parallel relation.

3. A fluoroscopic apparatus comprising a supporting frame, an X-ray tube, a fluoroscopic screen spaced from said X-ray tube and a fluoroscopic shutter carried on said frame and disposed between said X-ray tube and said fluoroscopic screen, said fluoroscopic shutter comprising a pair of L-shaped shutter plates each having a vertical and horizontal aperture defining arm, said plates being oppositely disposed so that their arms define a rectangular aperture therebetween, a parallelogram linkage controlling movement of said plates comprising a pair of levers each centrally pivoted to said supporting frame and pivotally intercoupled at opposite ends to said pair of plates to support and guide said plates with the levers and plates respectively forming opposing pairs of the elements of the parallelogram, and means intercoupled with one of said levers for rotating said lever, whereby rotation of one of said levers causes said plates to simultaneously approach or recede from each other to vary the intervening aperture defined therebetween simultaneously in both horizontal and vertical directions while the opposing aperture forming arms are maintained relatively parallel.

WEBSTER J. DALY.

REFERENCES CITED

The following references are of record in the file of this patent:

UNITED STATES PATENTS

| Number | Name | Date |
|---|---|---|
| 1,250,730 | Waite | Dec. 18, 1917 |
| 2,082,965 | Lundquist | June 8, 1937 |
| 2,132,076 | Kotraschek et al. | Oct. 4, 1938 |
| 2,456,096 | Wehmer | Dec. 14, 1948 |

FOREIGN PATENTS

| Number | Country | Date |
|---|---|---|
| 488,776 | France | Nov. 14, 1918 |